United States Patent [19]

Fair

[11] 4,135,599
[45] Jan. 23, 1979

[54] BASE PLATE AND EARTH COUPLING ASSEMBLY FOR SHEAR-WAVE TRANSDUCERS

[75] Inventor: Delbert W. Fair, Ponca City, Okla.

[73] Assignee: Continental Oil Company, Ponca City, Okla.

[21] Appl. No.: 848,222

[22] Filed: Nov. 3, 1977

[51] Int. Cl.² .............................................. G01V 1/14
[52] U.S. Cl. ....................................... 181/121; 73/665
[58] Field of Search ........................ 181/121, 113, 401; 340/15.5 SW; 73/665

[56] References Cited

U.S. PATENT DOCUMENTS

| | | | |
|---|---|---|---|
| 3,159,232 | 12/1964 | Fair | 181/401 |
| 3,372,770 | 3/1968 | Clynch | 181/401 |
| 3,716,111 | 2/1973 | Lavergne | 181/401 |

Primary Examiner—Nelson Moskowitz
Attorney, Agent, or Firm—William J. Miller

[57] ABSTRACT

Apparatus for supporting a vibrational shear wave transducer and coupling shear-wave energy into the earth's surface. The apparatus includes separate lateral base plate assemblies having the vibrator assembly operatively disposed therebetween, and the vibrator frame structure includes necessary hydraulic porting structure and supports manifold and servo valve control structure to provide a unitary, improved form of transducer apparatus. Each of the lateral base plate assemblies further includes a removable earth-coupling structure in the form of inverted pyramid or cleat structure having characteristic apex angles in both the lateral and longitudinal dimension so that earth coupling of energy is optimally effected.

10 Claims, 2 Drawing Figures

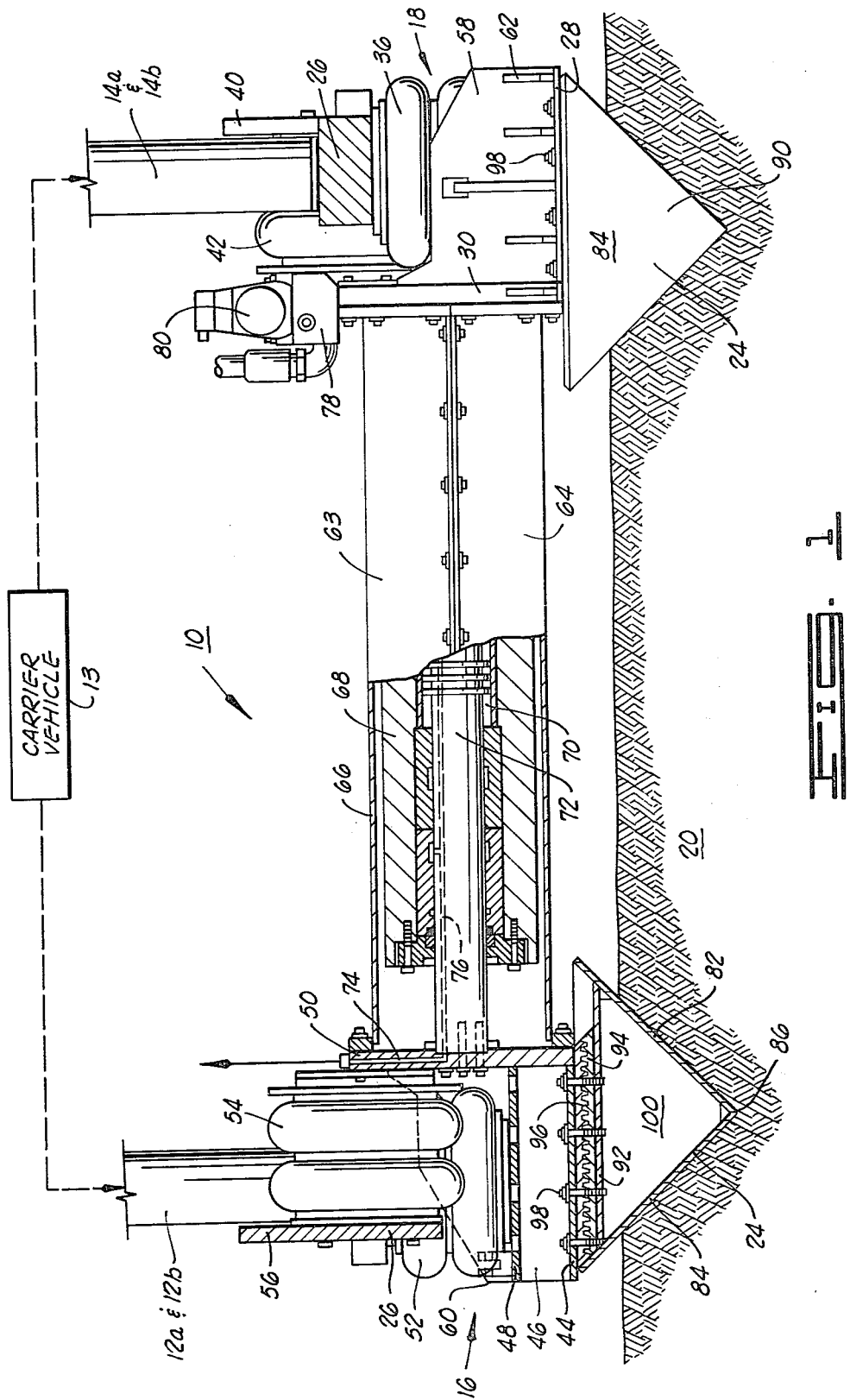

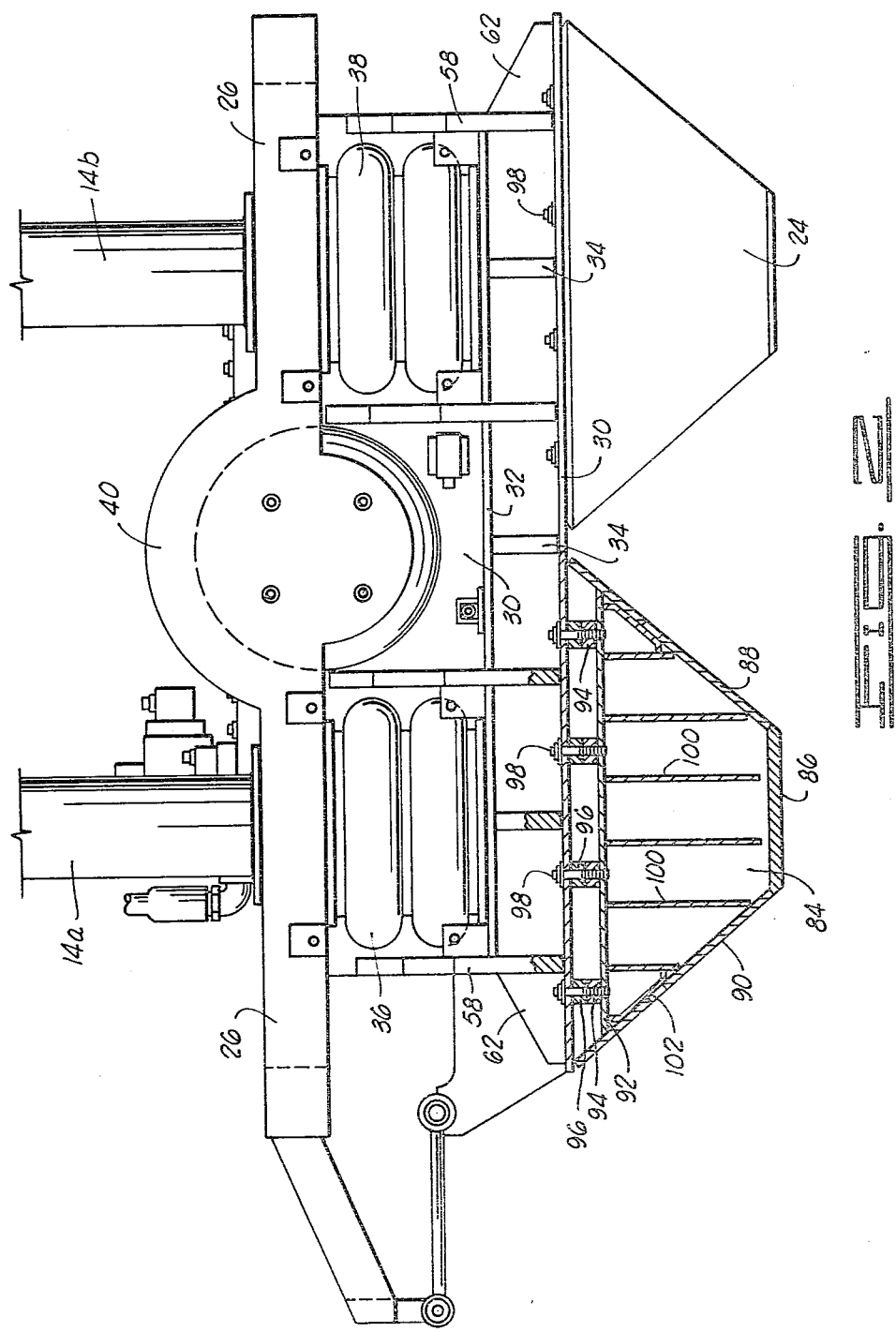

BASE PLATE AND EARTH COUPLING ASSEMBLY FOR SHEAR-WAVE TRANSDUCERS

BACKGROUND OF THE INVENTION

1. Field of the Invention

The invention relates generally to seismic energy vibrators and, more particularly, but not by way of limitation, it relates to an improved shear wave vibrator assembly for obtaining greater efficiency of energy input to an earth medium.

2. Description of the Prior Art

The prior art includes several types of vibrator support structures and earth-coupling structures which are the forerunner of the present invention. One teaching of particular interest is the U.S. Pat. No. 3,159,232 in the name of Delbert Fair and entitled "Shear Wave Transducer" which dealt with a shear wave vibrator assembly as rigidly supported by a single base plate, opposite sides of which included one or more pyramidal earth-coupling cleat structures of absolute symmetry and equi-angular character. The cleat structures in this invention were necessarily formed as an integral part of the base plate in order to assure the necessary positive coupling therebetween, an important consideration in coupling seismic energy into the earth's surface. Still other attempts are providing optimum coupling of shear wave energy into the earth's surface have taken the form of lateral cleating devices; see U.S. Pat. No. 3,372,770, in the name of Clynch, which teaches hydraulically driven lateral braces operative with the vibrational transducer to maintain the energy coupling base plate in positive contact with the earth throughout a vibrational sequence. In each case, the prior art attempts have fallen short of the prescribed mark due to the fact that the many different types of terrain will require a different form of coupling structure to best achieve seismic energy input to the earth.

SUMMARY OF THE INVENTION

The present invention contemplates an improved frame structure for a shear wave vibrational transducer, and improved base plate earth-coupling structure in association therewith. Thus, as particularly adapted for use of the shear wave transducer and a plural hydraulic cylinder drive type of transducer, the present invention utilizes opposite side base plate assemblies which serve to support the shear wave transducer and hydraulic piston elements as well as to provide hydraulic fluid porting and support for the manifold and servo valve assemblies. Each of the base plate structures then further includes removable cleat structure which may be varied by replacement to afford optimum earth-coupling gripping for particular earth surface materials and compaction characteristics.

Therefore, it is an object of the present invention to provide a shear wave transducer base plate and earth-coupling assembly which provides more efficient input of shear wave energy to the earth's surface.

It is also an object of the invention to provide earth coupling cleat assemblies which are readily replaceable to yield best coupling characteristics for a given earth surface area.

It is still another object of the present invention to provide a compact shear wave transducer structure that also includes a vibrator support structure offering greater reliability.

Finally, it is an object of this invention to provide an improved seismic energy shear wave transducer of the carrier mounted vibrator type that is capable of greater efficiency of energy input to the earth over a wider variation of terrain conditions.

Other objects and advantages of the invention will be evident from the following detailed description when read in conjunction with the accompanying drawings which illustrate the invention.

BRIEF DESCRIPTION OF THE DRAWINGS

FIG. 1 is a front view in elevation, with parts shown in section, of a seismic energy shear wave transducer constructed in accordance with the present invention; and FIG. 2 is a side view in elevation, with a portion shown in section, of the transducer of FIG. 1.

DETAILED DESCRIPTION OF THE INVENTION

As shown in FIGS. 1 and 2, a shear wave transducer 10 consists of opposite side support columns 12a and b, and 14a and b as would be positionably supported by an associated vehicle or carrier 13 of conventional type. The vibrator 10 is shown to be of the shear wave type supported by opposite side base plate structures 16 and 18 as coupled to the earth's surface 20 by means of respective cleat members 24 securely affixed therebeneath. The particular form of shear wave vibrator as shown in FIG. 1 is the particular subject matter of co-pending U.S. patent application Ser. No. 848,224 entitled "Seismic Transducer Construction", as filed an even date herewith, and the particular carrier support assembly is the subject matter of U.S. patent application Ser. No. 848,225, entitled "Lift and Isolation Assembly For Shear Wave Transducers", also concurrently filed herewith.

The vibrator assembly 10 is resiliently supported beneath a generally rectangular base frame 26 which extends around the vibrator unit and which is rigidly secured to the support columns 12 and 14. Such resilient support is given by vertical and horizontal air spring connections between base frame 26 and vibrator assembly 10. Thus, base plate assembly 18, consists of a base plate 28 rigidly secured as by welding to a right angle end plate 30 and, as shown in FIG. 2, including a support plate 32 welded in parallel over base plate 30 and being further supported by a plurality of rib plates 34. Vertical air springs 36 and 38 are then secured by means of bolts (not shown) at each end of support plate 32 to extend upward into bolt affixure to the underside of the box frame 26. Box frame 26 further includes a semi-circular portion 40 which serves as a seat to retain a lateral air spring 42 as secured to the outer surface of end plate 30.

The opposite side base plate assembly 16 is similarly constructed to include a base plate 44, rib plates 46, support plate 48 and end plate 50. Thus, vertical air springs such as rear air spring 52 (one only shown) are secured between the support plate 48 and the base of box frame 26, and a lateral air spring 54 is horizontally disposed between a semi-circular extension 56 of box frame 26 and the outer face of end frame 50. The particular vertical air springs utilized are those known as the double convolution type, while the horizontal springs are rolling diaphragm type, both well-known types that are commercially available from the Industrial Rubber Products Division of Firestone Rubber Company, Noblesville, Indiana.

Numerous reinforcing means such as gusset plates 58 and 60, and angle plates 62 are utilized in welded disposition to reinforce the joinder of base plates 28 and 44 to their respective end plates 30 and 50. High magnitude vibration forces must be endured during operation such that proper reinforcement and maximum stiffening of the structure, consisting of the cleat members 24, base plate assemblies 16 and 18, cover housings 63 and 64, and the cross-linking shear wave vibrator 66, is necessary.

The vibrator unit 66, a shear wave vibrator, utilizes a reaction mass 68 having one or more internal cylinders 70 and being driven by means of one or more piston rods 72 having rod ends affixed in sealed engagement to the inner facings of end plates 50 and 30. Thus, hydraulic porting 74 through end plate 50 is in communication with rod end port 76 to provide communication for bleed back porting of the hydraulic piston assembly. In like manner, the remainder of piston rods 72 (not specifically shown) include rod end bores in communication with further bores in end plate 30 which then communicate through paralleling manifold 78 and servo valve 80 to the requisite hydraulic supply lines. Such structure enables the routing of all hydraulic fluid lines through end plates 30 or 50 with elimination of connections through the reaction mass 68. The particular structure of vibrator unit 66, particularly a plural piston vibrator, is the subject matter of the aforementioned U.S. application Ser. No. 848,224, entitled "Seismic Transducer Construction".

Cleat members 24 are utilized for earth engagement on each side of the vibrator assembly 10, and each may be of identical structure. The cleat members 24 may vary widely in shape and angular structure, this depending largely upon the hardness and consistency of the earth surface 20. In most cases, the members 24 may take the shape of inverted generally conical or pyramidal members, or frustums of such, and an important angular specification is observed; that is, that the load faces or lateral faces disposed perpendicular or normal to the direction of vibrator movement must be set at a lesser angle to the horizontal than the front and rear faces disposed normal to carrier vehicle alignment. Thus, during vibratory operation, it must occur that the lateral or load faces tend to sink into earth surface 20 more slowly than the front and rear faces so that vibratory energy coupling is achieved for the shot duration. The cleat members 24, as illustrated, are formed by a pair of trapezoidally shaped load plates 82 and 84 joined as by welding to form a cleat edge 86 at the apex. The remaining opposite two sides, front and rear plates 88 and 90, are merely formed as an equi-angular triangle plate of proper dimension to be weld secured on each side between plates 82 and 84 thereby to complete formation of an elongated pyramidal outer cover of cleat 24. The angle to the horizontal of front and rear plates 88 and 90 are made greater than the angle of lateral load plates 82 and 84, as will be further described.

As shown in the cut-away portions of FIGS. 1 and 2, a support plate 92 is secured by welding in parallel with cleat edge 86 as secured down within angle plates 82, 84, 88 and 90 by a sufficient distance to allow for inclusion of a gear rack gripping arrangement. Thus, a plurality of toothed racks 94 are secured along the upper surface of support plate 92 in parallel array, and racks 94 are aligned transversely, i.e., in the direction of shear wave generator thrust, A mating plurality of toothed racks 96 are then secured as by welding to the underside of base plate 30 (and base plate 44 as well) in the same parallel alignment and spacing as racks 94 so that the cleat 24 can be positioned and readily attached by insertion of a plurality of bolts 98 as fastened into a suitably threaded bore within racks 94.

The cleat members 24 are further strengthened by weld placement of a plurality of internal stiffening plates 100, as welded in parallel disposition within the internal confines of the lateral load plates 82 and 84 and front and rear plates 88 and 90. Yet additional reinforcing plates 102 may be weld secured to the base of plates 88 and 90 adjacent support plate 92. Each of the pyramidal cleats 24 is identically constructed and interchangeable and, in the illustrated design, the exterior angles of the faces relative to horizontal are varied so that load plates 82 and 84 are disposed at an angle of 45° relative to a horizontal plane passing through cleat edge 86, and the front and rear plates 88 and 90 are disposed at an angle of 50° relative to the same horizontal plane. To reiterate, the variation in attack angle enables a distinct advantage as to cleat gripping over a duration of vibrational output, as coupling will be maintained in the earth surface material for the necessary period of time.

For different types of materials in earth surface 20, different shapes and angular construction of cleat 24 are utilized. In general, it follows that the smaller the exterior angle between lateral load faces and the horizontal, the greater must be the hold down force on the vibrator assembly. For example, calculated data relative to the illustrated embodiment, with lateral vibrator force of 30,900 lbs. and coefficient of friction of 0.5, derives baseplate hold down weights as follows:

| Load Face Angle | Hold Down Weight |
| --- | --- |
| 45° | 15,450 lbs. |
| 40° | 21,376 lbs. |
| 30° | 38,070 lbs. |

The actual shape of lateral load plates 82 and 84 may also vary to best meet exigencies for particular terrain situations. Thus, the length of cleat edge 86, and therefore the overall area of load plates 82 and 84, will vary, and will be greater for utilization with softer earth surface materials.

Rigid interconnection of the vibrator unit, i.e. piston rods 72 supporting reaction mass 68, between end plates 30 and 50 produces a continuous, laterally rigid frame structure across the entire assembly. Further, lateral strengthening is supplied by cover housings 63 and 64 which are bolt secured between end plates 30 and 50 to totally enclose the vibrator moving parts, the mass and piston elements. Cover housings 63 and 64 are currently constructed of high tensile steel to provide minimal weights yet additional lateral support of high strength.

The housings 63 and 64 simiplify fabrication of baseplate assemblies 16 and 18 while also enabling a more efficient construction relative to the hydraulic supply system. Thus, hydraulic fluid is ported through end plates 30 and 50 to piston rods 72. The manifold 78 and servo valve 80 are carried as direct mounted on the end frame 30. Such mounting of servo valve 80, instead of the more conventional mounting on the reaction mass, gives the benefit of lesser vibrational horizontal movement during operation and tends to increase reliability of both the hydraulic and electrical connections to the vibrator assembly.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. Shear wave transducer apparatus of the type utilizing a reaction mass that is hydraulically driven in reciprocation relative to one or more double rod end pistons, comprising:

first and second baseplate means;

first and second cleat means each secured to a respective one of the first and second baseplate means to extend into earth surface engagement;

means bearing vertically on said first and second baseplate means and cleat means to effect shear wave transducer earth coupling;

an end plate rigidly secured to said baseplate at a right angle thereto, said end plate being securely affixed to one end of each said piston; housing means of rigid material connected between the end plates of said first and second baseplate means to totally enclose said reaction mass and said one or more double rod end pistons; and hydraulic fluid ports formed in each end plate of said first and second baseplate means for coactive communication through said one or more double rod end pistons.

2. Apparatus as set forth in claim 1 wherein said baseplate means each comprise:

a baseplate receiving a cleat means therebeneath in secure affixure.

3. Apparatus as set forth in claim 1 wherein said cleat means each comprise:

inverted, generally pyramidal structure having a base; and means for securing said base by removable affixure to said respective baseplate means.

4. Apparatus as set forth in claim 2 wherein each said cleat means comprises:

inverted, generally pyramidal structure having a base; and means for securing said base by removable affixure to said respective base plate.

5. Apparatus as set forth in claim 1 which further includes:

housing means of structurally rigid material connected between said first and second baseplate means to totally enclose said reaction mass and said one or more double rod end pistons.

6. Apparatus as set forth in claim 1 which is further characterized to include:

manifold means having selected hydraulic ports and being affixed to one end plate in coactive communication with the hydraulic fluid ports therein; and servo valve means affixed to said manifold means.

7. Apparatus as set forth in claim 3 wherein said pyramidal structure comprises:

first and second load plates of equi-angular trapezoidal shape rigidly joined at one common edge to form a cleat edge;

third and fourth opposite sides of triangular shape each rigidly joined to respective edges of the first and second load plates that are adjacent said cleat edge; and plate means secured to all said load plates and opposite sides at base of said pyramidal structure.

8. Apparatus as set forth in claim 7 which includes:

a plurality of triangular stiffener plates rigidly secured in spaced, parallel disposition throughout said cleat means perpendicular to said first and second load plates.

9. Apparatus as set forth in claim 4 wherein said means for securing comprises:

a plurality of first rack means secured in parallel to said base plate and exposing a first toothed surface;

a plurality of second rack means secured in parallel to said pyramidal structure base and exposing a second toothed surface for mating engagement with said first toothed surface; and fastening means for securing each of said first rack means to said second rack means.

10. In a shear wave transducer apparatus of the type utilizing a reaction mass that is hydraulically driven in reciprocation relative to one or more double rod end pistons which includes a first and second baseplate which is rigidly secured to first and second ends of each said piston, first and second cleat means each secured to a respective one of the first and second baseplate means to extend into earth surface engagement and means bearing vertically on said first and second baseplate means and cleat means to affect shear wave transducer earth coupling, an improvement comprising:

a plurality of first rack means secured in parallel to said base plate and exposing a first toothed surface;

a plurality of second rack means secured in parallel to said pyramidal structure base and exposing a second toothed surface for mating engagement with said first toothed surface; and fastening means for securing each of said first rack means to said second rack means.

* * * * *